(12) United States Patent
Chen

(10) Patent No.: US 10,672,347 B2
(45) Date of Patent: Jun. 2, 2020

(54) DISPLAY DEVICE

(71) Applicant: Ultra Display Technology Corp., Taipei (TW)

(72) Inventor: Hsien-Te Chen, Taipei (TW)

(73) Assignee: ULTRA DISPLAY TECHNOLOGY CORP., Taipei (TW)

( * ) Notice: Subject to any disclaimer, the term of this patent is extended or adjusted under 35 U.S.C. 154(b) by 30 days.

(21) Appl. No.: 16/162,752

(22) Filed: Oct. 17, 2018

(65) Prior Publication Data

US 2019/0114974 A1 Apr. 18, 2019

(30) Foreign Application Priority Data

Oct. 18, 2017 (TW) .............................. 106135764 A

(51) Int. Cl.
*G09G 3/34* (2006.01)
*G02F 1/13357* (2006.01)
*G02F 1/1335* (2006.01)
*H01L 27/32* (2006.01)

(52) U.S. Cl.
CPC ..... *G09G 3/3406* (2013.01); *G02F 1/133512* (2013.01); *G02F 1/133514* (2013.01); *G02F 1/133603* (2013.01); *H01L 27/32* (2013.01); *G02F 2001/133614* (2013.01); *G09G 2330/021* (2013.01)

(58) Field of Classification Search
CPC ............ G09G 3/3406; G09G 2330/021; H01L 27/32; G02F 1/133603; G02F 1/133512; G02F 1/133514; G02F 2001/133614; G02F 1/133606; G02F 1/133609
See application file for complete search history.

(56) References Cited

U.S. PATENT DOCUMENTS

| | | | | |
|---|---|---|---|---|
| 10,514,574 B2* | 12/2019 | Cheng | .............. | G02F 1/133606 |
| 2012/0250350 A1* | 10/2012 | Kim | .................. | G02F 1/133603 |
| | | | | 362/606 |
| 2014/0339495 A1* | 11/2014 | Bibl | ..................... | H01L 27/156 |
| | | | | 257/13 |
| 2014/0367633 A1* | 12/2014 | Bibl | ................... | G02F 1/133603 |
| | | | | 257/13 |
| 2015/0198834 A1* | 7/2015 | Wu | .................... | G02F 1/133514 |
| | | | | 349/61 |

(Continued)

*Primary Examiner* — Ibrahim A Khan
(74) *Attorney, Agent, or Firm* — Muncy, Geissler, Olds & Lowe, P.C.

(57) ABSTRACT

A display device has a plurality of sub-pixels, and includes a circuit substrate, a plurality of micro light-emitting semiconductor elements, a light conversion layer and an opposite substrate. The micro light-emitting semiconductor elements are disposed separately on the circuit substrate and configured corresponding to the sub-pixels. The light conversion layer has a plurality of light conversion portions disposed respectively corresponding to at least partial of the micro light-emitting semiconductor elements. The light emitted from the micro light-emitting semiconductor element corresponding to the sub-pixel passes through the light conversion portion to generate white light. The opposite substrate is disposed at one side of the light conversion layer away from the circuit substrate. In another display device, the light emitted from the micro light-emitting semiconductor element passes through the light conversion layer to generate white light.

18 Claims, 8 Drawing Sheets

(56) References Cited

U.S. PATENT DOCUMENTS

| | | | |
|---|---|---|---|
| 2015/0300576 A1* | 10/2015 | Matsuura | G02F 1/133603 |
| | | | 362/97.1 |
| 2017/0017022 A1* | 1/2017 | Yonemoto | G02F 1/1336 |
| 2017/0138548 A1* | 5/2017 | Kurita | G02B 5/0278 |
| 2018/0190747 A1* | 7/2018 | Son | G06F 3/1446 |
| 2018/0341151 A1* | 11/2018 | Kurita | G02F 1/133603 |
| 2019/0041701 A1* | 2/2019 | Chen | G02F 1/133512 |
| 2019/0074324 A1* | 3/2019 | Kim | H01L 27/1218 |
| 2019/0097097 A1* | 3/2019 | Ko | G02F 1/133603 |

* cited by examiner

DISPLAY DEVICE

CROSS REFERENCE TO RELATED APPLICATIONS

This Non-provisional application claims priority under 35 U.S.C. § 119(a) on Patent Application No(s). 106135764 filed in Taiwan, Republic of China on Oct. 18, 2017, the entire contents of which are hereby incorporated by reference.

BACKGROUND

Technology Field

This disclosure relates to a display device and, in particular, to a flat display device having power saving and local dimming functions.

Description of Related Art

With the development of technologies, flat display devices have been widely applied to various fields. Due to the advantages such as low power consumption, less weight, compact size and less radiation, the liquid crystal display (LCD) devices have gradually replaced the traditional cathode ray tube display (CRT) display devices and been applied to various electronic products, such as mobile phones, portable multimedia devices, notebook computers, liquid crystal TVs and liquid crystal screens.

Regarding the liquid crystal display (LCD) device, since the liquid crystal molecules cannot emit light by themselves, the backlight module is needed for outputting light, which passes through the LCD panel for displaying the image. Generally, when it is desired to show a black image on a part of the LCD panel, the control circuit of the display panel will control the switch elements corresponding to the region of the black image to block the light, so that the light cannot pass through the corresponding liquid crystal molecules, thereby generating the desired black image. However, the backlight module is still turned on when displaying the black image. Another method is to utilize a local dimming driving control circuit for partially turning on and partially turning off the backlight module so as to achieve the display of a black image on a part of the LCD panel.

However, in the above-mentioned first method, the backlight module continuously turns on to emit light, so the power consumption is higher. In the second method, the local dimming control circuit has a very complicated structure, which can increase the manufacturing cost. Accordingly, the conventional LCD device cannot achieve the local dimming, decrease the power consumption, and lower the cost at the same time.

SUMMARY

An objective of the present disclosure is to provide a flat display device that has a simple structure and can decrease the power consumption and achieve the local dimming.

To achieve the above, the present disclosure provides a display device having a plurality of sub-pixels. The display device comprises a circuit substrate, a plurality of micro light-emitting semiconductor elements, a light conversion layer, and an opposite substrate. The micro light-emitting semiconductor elements are disposed separately on the circuit substrate and configured corresponding to the sub-pixels. The light conversion layer has a plurality of light conversion portions disposed respectively corresponding to at least partial of the micro light-emitting semiconductor elements. The light emitted from the micro light-emitting semiconductor element corresponding to each of the sub-pixels passes through the light conversion portion to generate white light. The opposite substrate is disposed at one side of the light conversion layer away from the circuit substrate.

In one embodiment, each of the micro light-emitting semiconductor elements has a side length greater than or equal to 1 µm and less than or equal to 100 µm.

In one embodiment, each of the micro light-emitting semiconductor elements emits blue light and green light at the same time.

In one embodiment, a thickness of the light conversion layer is greater than or equal to 6 µm and less than or equal to 30 µm.

In one embodiment, the light conversion layer comprises at least a light conversion substance, the light conversion substance is a quantum dot or a fluorescent particle, the quantum dot or the fluorescent particle is mixed within a paste material to form the light conversion layer, and the light conversion layer covers the micro light-emitting semiconductor elements.

In one embodiment, the circuit substrate is a matrix circuit substrate, the matrix circuit substrate comprises a substrate and a matrix circuit, the matrix circuit is disposed on the substrate, and the micro light-emitting semiconductor elements are disposed on the matrix circuit and electrically connected with the matrix circuit.

In one embodiment, the display device further comprises a black matrix layer disposed on the circuit substrate. The black matrix layer has a plurality of light-shielding regions, and the light-shielding regions are disposed around the micro light-emitting semiconductor elements to form the light conversion portions.

In one embodiment, the opposite substrate is a cover substrate, a monochrome filter substrate, or a color filter substrate.

In one embodiment, the color filter substrate comprises a transparent substrate and a plurality of filter portions, each of the filter portions is disposed between the transparent substrate and corresponding one of the light conversion portions, and the filter portions are disposed corresponding to the micro light-emitting semiconductor elements, respectively.

In one embodiment, the display device further comprises a transparent photoresist member disposed on the opposite substrate and covering at least one of the micro light-emitting semiconductor elements, and at least one of the micro light-emitting semiconductor elements emits blue light or green light.

In one embodiment, a part of the opposite substrate corresponding to the transparent photoresist member is not configured with a filter material.

In one embodiment, the display device further comprises a sealant layer disposed at outer peripheries of the circuit substrate and the opposite substrate.

To achieve the above, the present disclosure also provides a display device, which comprises a backlight module and a display panel. The backlight module comprises a circuit substrate, a plurality of micro light-emitting semiconductor elements, and a light conversion layer. The micro light-emitting semiconductor elements are disposed separately on the circuit substrate. The light conversion layer is disposed on the micro light-emitting semiconductor elements, and light emitted from the micro light-emitting semiconductor elements passes through the light conversion layer to generate white light. The display panel is disposed opposite to the backlight module.

In one embodiment, the light conversion layer comprises at least a light conversion substance, the light conversion substance is a quantum dot or a fluorescent particle, the quantum dot or the fluorescent particle is mixed within a paste material to form the light conversion layer, and the light conversion layer covers the micro light-emitting semiconductor elements.

In one embodiment, the light conversion layer is an optical film.

In one embodiment, the backlight module further comprises an opposite substrate, the opposite substrate is disposed between the light conversion layer and the display panel, and the opposite substrate is an optical film.

As mentioned above, the display device of this disclosure is configured with a light conversion layer on the micro light-emitting semiconductor elements, and the light conversion layer has a plurality of light conversion portions disposed respectively corresponding to at least partial of the micro light-emitting semiconductor elements. The light emitted from the micro light-emitting semiconductor element corresponding to each of the sub-pixels passes through the light conversion portion to generate white light. Alternatively, the display device of this disclosure comprises a display panel and a backlight module disposed opposite to each other, and the backlight module comprises a light conversion layer disposed on the micro light-emitting semiconductor elements. The light emitted from the micro light-emitting semiconductor elements passes through the light conversion layer to generate white light. Accordingly, the display device of this disclosure is different from the conventional flat display device, and the structure of the display device of this disclosure has simple structure and can decrease the power consumption and achieve the local dimming function. In some embodiments, the materials are easily prepared, and the manufacturing process is simpler. As a result, the display device of this disclosure has simpler structure and lower manufacturing cost.

BRIEF DESCRIPTION OF THE DRAWINGS

The disclosure will become more fully understood from the detailed description and accompanying drawings, which are given for illustration only, and thus are not limitative of the present disclosure, and wherein.

DETAILED DESCRIPTION OF THE DISCLOSURE

The present disclosure will be apparent from the following detailed description, which proceeds with reference to the accompanying drawings, wherein the same references relate to the same elements.

In order to describe the structure of the display devices, the following top views of the embodiment only show the necessary components and the relations thereof, but do not show all of the components in the corresponding schematic diagrams.

Figure 1A:
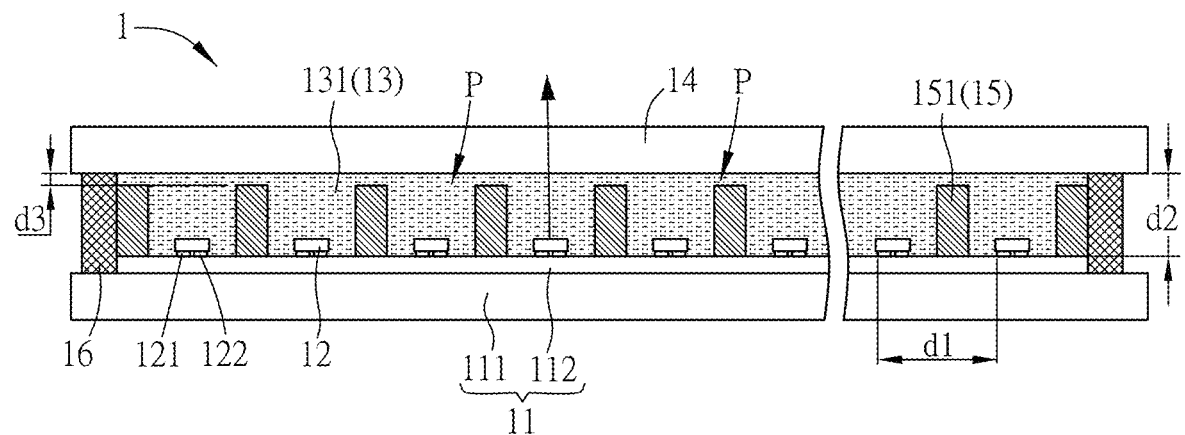
FIG. 1A is a schematic diagram showing a display device according to an embodiment of this disclosure.
Figure 1B:
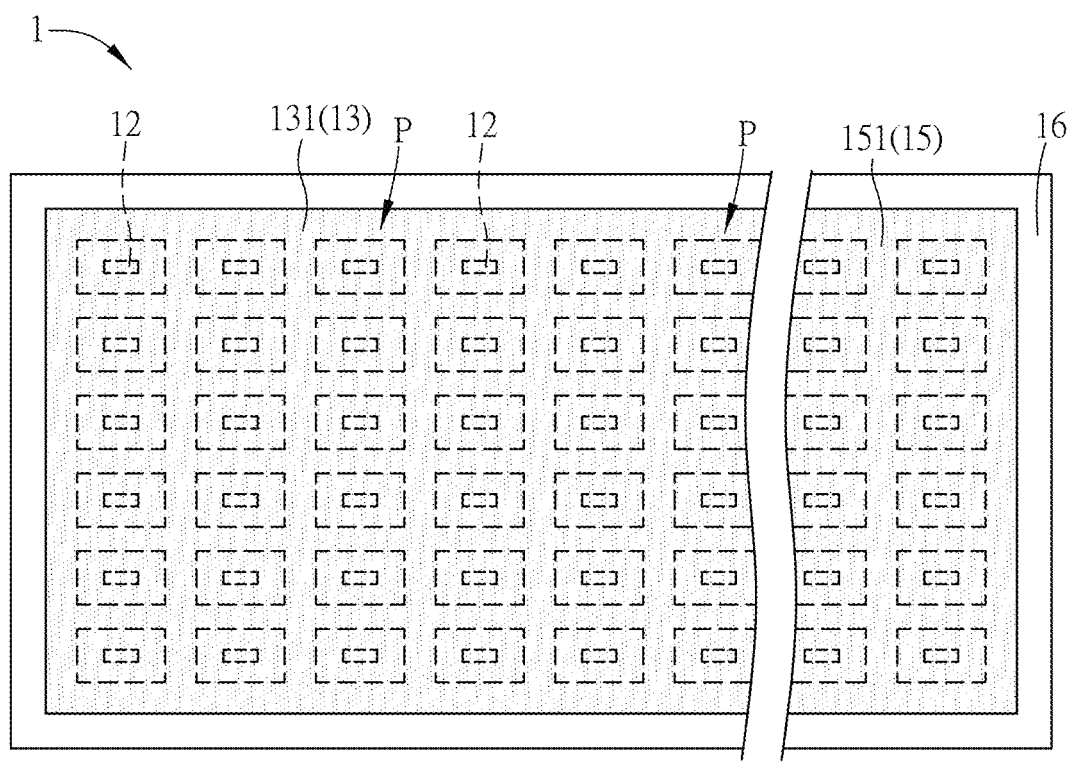
FIG. 1B is a top view of FIG. 1A.

FIG. 1A is a schematic diagram showing a display device 1 according to an embodiment of this disclosure, and FIG. 1B is a top view of FIG. 1A. As shown in FIGS. 1A and 1B, the display device 1 is a flat display device having a plurality of pixels, and each pixel has a plurality of sub-pixels P. The display device 1 comprises a circuit substrate 11, a plurality of micro light-emitting semiconductor elements 12, a light conversion layer 13, and an opposite substrate 14. In addition, the display device 1 further comprises a black matrix layer 15 and a sealant layer 16.

The circuit substrate 11 can be an active matrix (AM) circuit substrate or a passive matrix (PM) circuit substrate, and the micro light-emitting semiconductor elements 12 are disposed separately on the surface of the circuit substrate 11. In this embodiment, the circuit substrate 11 is an AM circuit substrate. The AM circuit substrate (circuit substrate 11) may comprise a substrate 111 and a matrix circuit 112, and the matrix circuit 112 is disposed on a surface of the substrate 111 facing the opposite substrate 14. The micro light-emitting semiconductor elements 12 are disposed on the matrix circuit 112 and electrically connected with the matrix circuit 112.

In practice, the substrate 11 can be a flexible substrate or a rigid substrate, which is made by transparent or non-transparent material. The transparent material can be, for example, glass, quartz, sapphire or the likes, plastic, rubber, glass fiber, or other polymer materials. Preferably, the substrate 11 can be an alumino silicate glass substrate, or it can be made of an organic polymer material. In some embodiments, the above organic polymer material is, for example but not limited to, polyimide (PI), polycarbonate (PC), or polyethylene terephthalate (PET). If the substrate 11 is made of polyimide (PI), the glass transition temperature thereof can be, for example, between 400° C. and 600° C.

The circuit substrate 11 of the present embodiment can be, for example, an AM circuit substrate of a LCD panel. The matrix circuit 112 of the circuit substrate 11 may include components such as interleaved data lines and scan lines, a plurality of active components (e.g. thin film transistors), a scan driving circuit, a data driving circuit, and a timing control circuit. One pixel P can correspond to one active component and at least one micro light-emitting semiconductor element 12, and each active component is electrically connected to at least one micro light-emitting semiconductor element 12. In practice, the scan lines can control the active elements, so that the data voltages transmitted via the data lines can be transmitted to the micro light-emitting semiconductor elements 12 through the switch elements for controlling the micro light-emitting semiconductor elements 12 to emit light. Since the AM circuit substrate is a well-known art of the LCD device, it is not the focus of the present disclosure, and those skilled in the art can find related technical content, so the details thereof will not be further described herein.

The micro light-emitting semiconductor elements 12 may be arranged in an array and disposed on the matrix circuit 112 of the circuit substrate 11. In some embodiments, the micro light-emitting semiconductor elements 12 can be electrically coupled to the matrix circuit 112, for example, by surface mount technology (SMT). The micro light-emitting semiconductor elements 12 of the present embodiment is exemplified by a micro light-emitting diode (µLED), and the display device 1 is a µLED display device. The micro light-emitting semiconductor elements 12 of the present embodiment are arranged in a two-dimensional array. However, this disclosure is not limited thereto. In other embodiments, the micro light-emitting semiconductor elements 12 may also be arranged in a one-dimensional array.

The micro light-emitting semiconductor elements 12 are respectively disposed corresponding to the sub-pixels P. In this embodiment, one micro light-emitting semiconductor element 12 may correspond to one sub-pixel P, and this disclosure is not limited thereto. In other embodiments, multiple micro light-emitting semiconductor elements 12 may correspond to one sub-pixel P. The side length of the micro light-emitting semiconductor element 12 may be greater than or equal to 1 µm and less than or equal to 100 µm. In some embodiments, the side length of the micro light-emitting semiconductor element 12 can be, for example, less than 50 µm (e.g. an element with a size of 25 µm×25 µm). Furthermore, the minimum pitch d1 of two adjacent micro light-emitting semiconductor elements 12 is, for example but not limited to, 1 µm, so that a display having a relatively high resolution, such as a medical display, can be manufactured.

The micro light-emitting semiconductor element 12 (micro light-emitting diode) may be a two-electrode element or a three-electrode element. In this embodiment, the micro light-emitting semiconductor element 12 is a two-electrode element. The two electrodes 121 and 122 of the micro light-emitting semiconductor element 12 may have the p-pole and the n-pole on the same side (horizontal structure), or the p-pole and the n-pole on the upper and lower sides respectively (vertical structure). In this embodiment, the micro light-emitting semiconductor element 12 is a µLED with a horizontally structured. In addition, if classified by color rendering wavelength, the micro light emitting semiconductor element 12 may be a blue light-emitting diode, or a red light, green light, infrared light, or ultraviolet light (UV light) micro light-emitting diode, or a combination thereof. Alternatively, in different embodiments, the micro light-emitting semiconductor element 12 can also emit blue light and green light at the same time, and this disclosure is not limited. Therefore, in the display device 1 of the present embodiment, the micro light-emitting semiconductor elements 12 (µLEDs) corresponding to the respective pixels P can be driven by the matrix circuit 112 of the circuit substrate 11 in accordance with the display image with a partial black portion. Herein, some micro light-emitting semiconductor elements 12 corresponding to the partial black portion can be turned off. Accordingly, the display device 1 can achieve the desired local dimming function, thereby achieving power saving.

The light conversion layer 13 is disposed on the micro light-emitting semiconductor elements 12. The thickness d2 of the light conversion layer 13 may be greater than or equal to 6 µm and less than or equal to 30 µm. In addition, the light conversion layer 13 has a plurality of light conversion portions 131, which are respectively disposed corresponding to at least a part of the micro light-emitting semiconductor elements 12. The light conversion portions 131 of the present embodiment are respectively disposed corresponding to the micro light-emitting semiconductor elements 12. The light conversion portion 131 may have a photoluminescence material. When the light enters the light conversion portion 131, the light conversion portion 131 can be excited to emit light with a different color. Specifically, the light emitted from the micro light-emitting semiconductor element 12 of the present embodiment enters the light conversion portion 131, and then the light conversion portion is excited to generate the light of a different color. Accordingly, the white light can be finally outputted from the light conversion portion 131.

The light conversion portion 131 of the light conversion layer 13 may have at least one light conversion substance, and the light conversion substance may be quantum dots or fluorescent particles. In this embodiment, the light conversion substance of the light conversion portion 131 comprises, for example, a quantum dot, and preferably comprises two quantum dots of different shapes or sizes for absorbing the high-energy light emitted from the micro light-emitting semiconductor element 12 to generate the visible light in different bandwidths. For example, two kinds of quantum dots can absorb high-energy blue or UV light to excite the low-energy red and green lights. Afterwards, the unabsorbed residual high-energy blue light and generated red and green lights outputted from the two kinds of excited quantum dots can be outputted from the light conversion portion 131 and then mixed to form a white light. Alternatively, in another embodiment, the quantum dots of the light conversion portion 131 can absorb high-energy blue light and green light emitted from the micro light-emitting semiconductor element 12 to excite the low-energy red light. In this case, the light conversion portion 131 comprises only one size or shape of quantum dots, and the conversion efficiency of the light conversion portion 131 is better. Afterwards, the unabsorbed residual high-energy blue light and green light and the excited red light are outputted from the light conversion portion 131 and then mixed to form the white light.

To be noted, in practice, the above-mentioned light conversion substance (quantum dots or fluorescent particles) can be uniformly mixed in a paste material (e.g. epoxy) to form a jelly-type light conversion material, which can be applied to cover the micro light-emitting semiconductor elements 12 and the matrix circuit 112. Then, the jelly-type light conversion material is solidified to form the light conversion layer 13. In addition, the light-shielding regions 151 of the black matrix layer 15 are disposed around each of the micro light-emitting semiconductor elements 12 to form the light conversion portions 131, thereby obtaining a plurality of sub-pixels P corresponding to the plurality of light conversion portions 131 and the plurality of micro light-emitting semiconductor elements 12. In this case, for example, one sub-pixel corresponds to one micro light-emitting semiconductor element. Of course, one sub-pixel may comprise a plurality of micro light-emitting semiconductor elements. It is to be noted that the light-shielding regions 151 of the black matrix layer 15 of the present embodiment are disposed around each of the micro light-emitting semiconductor elements 12, and have a gap d3 from the opposite substrate 14. However, in different embodiments, each of the light-shielding regions 151 of the black matrix layer 15 can also contact against the opposite substrate 14, and this disclosure is not limited thereto.

In addition, the conventional method cannot form the white light in the light conversion layer and output the white light from the light conversion layer (the colors of the lights corresponding to the pixels P are the same white light in the conventional art), but one sub-pixel P corresponds to one color of light (the colors of adjacent sub-pixels are different). Therefore, in the conventional method, the RGB pattern must be formed in the light conversion layer. That is, in order to emit RGB patterns of different colors, different kinds of light conversion substances must be separately formed on the micro light-emitting semiconductor elements 12. Thus, the full-color display can be produced without forming a color filter, so that the manufacturing process is complicated and the manufacturing cost is increased. However, in the display device 1 of the present embodiment, the light conversion layer 13 does not need to produce the light conversion portions having the RGB pattern corresponding to each of the light-emitting elements, respectively, but mixes the light conversion materials within the paste material, which is applied to cover the micro light-emitting semiconductor elements 12 to form the light conversion layer 13. Herein, the light conversion layer 13 is partitioned by the light-shielding regions 151 to respectively form light conversion portions corresponding to the micro light-emitting semiconductor elements 12, respectively. The contents of the respective light conversion portions are the same. Therefore, the material preparation is easy, the manufacturing process is simple, the structure of the display device 1 is simple, and the manufacturing cost is low.

The opposite substrate 14 is disposed on one side of the light conversion layer 13 away from the circuit substrate 11. In this embodiment, the light conversion layer 13 is sandwiched between the opposite substrate 14 and the circuit substrate 11, and the single layer of the light conversion layer 13 is divided into a plurality of light conversion portions 131 by the black matrix layer 15 on the circuit substrate 11. Two light conversion portions 131 may or may not be connected. Herein, the light-shielding regions 151 of the black matrix layer 15 are disposed corresponding to the light conversion portions 131 of the sub-pixels P and the micro light-emitting semiconductor elements 12, such that one sub-pixel P corresponds to one light conversion portion 131 and one micro light-emitting semiconductor element 12. The black matrix layer 15 functions to avoid light mixing of adjacent sub-pixels, and the material thereof can be the same as the black matrix (BM) in the conventional LCD device. The details thereof will not be further described herein.

The opposite substrate 14 may be a flexible substrate or a rigid substrate, and may be a protective substrate, a monochromatic filter substrate (e.g. a blue filter substrate), or a color filter substrate. The protective substrate may be a protective cover, a protective layer or a protective film, and this disclosure is not limited. In this embodiment, the opposite substrate 14 is, for example, a light-permeable protective substrate, such as a glass substrate or a polymer transparent substrate. Furthermore, when the opposite substrate 14 is a protective substrate or a monochromatic filter substrate, the effect of the monochrome display can be obtained by controlling the light-emission intensity of each of the micro light-emitting semiconductor elements 12 corresponding to each pixel P. In this case, the display device 1 can be a monochrome display. In addition, when the opposite substrate 14 is a color filter substrate, which includes, for example, the filter materials (R, G and B or R, B, and W), the display device 1 can function as a full-color display. The details thereof will be described hereinbelow.

The sealant layer 16 is disposed at the outer peripheries of the circuit substrate 11 and the opposite substrate 14. In some embodiments, the sealant layer 16 may be a light-curable adhesive (e.g. a UV adhesive), and is disposed at the outer peripheries of the circuit substrate 11 and the opposite substrate 14 by, for example but not limited to, a coating method under the atmosphere. Thus, the light conversion layer 13 can be located within the sealant layer 16, the circuit substrate 11 and the opposite substrate 14. In other embodiments, the sealant layer 16 may also be a thermosetting adhesive or a combination of a light-curable adhesive and a thermosetting adhesive, and this disclosure is not limited.

Figure 2A:
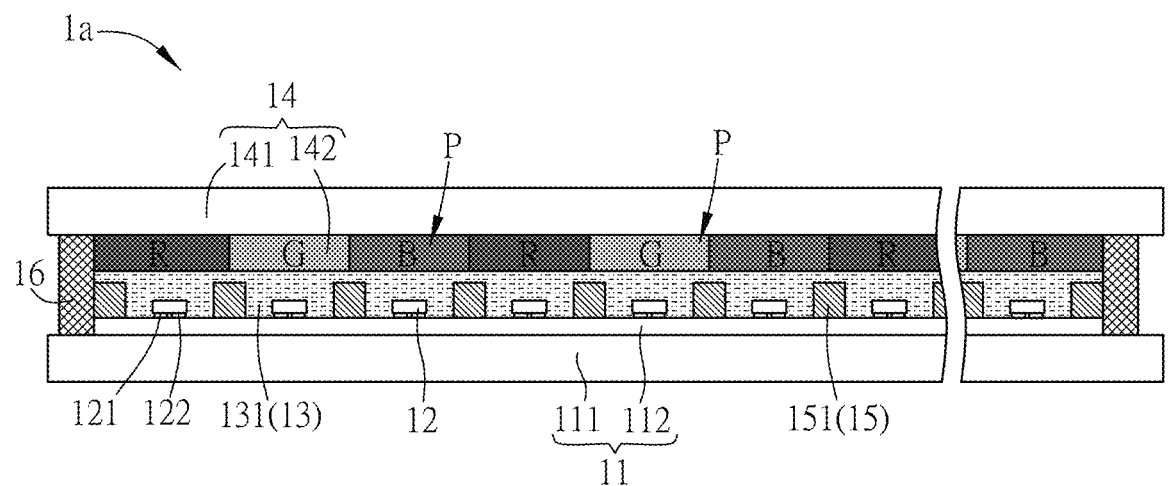
FIG. 2A is a schematic diagram showing another display device of this disclosure.
Figure 2B:
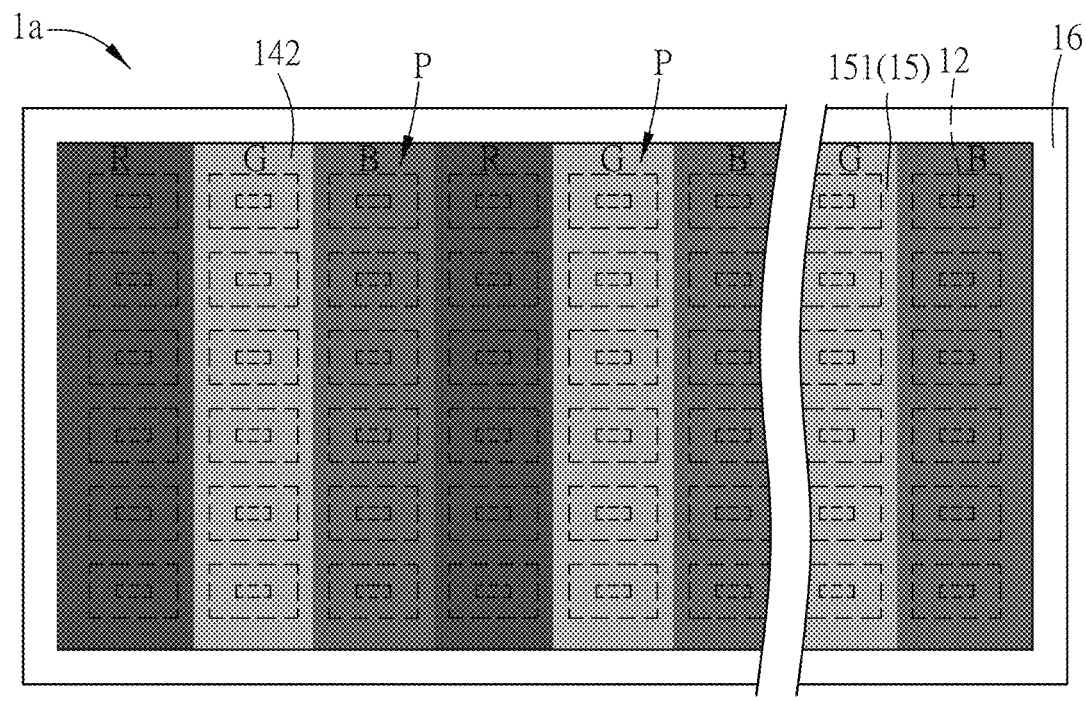
FIG. 2B is a top view of FIG. 2A.

FIG. 2A is a schematic diagram showing a display device 1*a* according to another embodiment of this disclosure, and FIG. 2B is a top view of FIG. 2A. Different from the display device 1 of FIGS. 1A and 1B, as shown in FIGS. 2A and 2B, the opposite substrate 14 of the display device 1*a* is a color filter substrate instead of a protective substrate. In this embodiment, the color filter substrate (the opposite substrate 14) may comprise a transparent substrate 141 and a plurality of filter portions 142. Each of the filter portions 142 is disposed corresponding to one sub-pixel P and located between the transparent substrate 141 and the corresponding light conversion portion 131, and the filter portions 142 are disposed corresponding to the micro light-emitting semiconductor elements 12, respectively.

The transparent substrate 141 may be a hard plate or a soft plate, and this disclosure is not limited. In this embodiment, the filter portions 142 include red (R), green (G) and blue (B) filter portions, which arranged in sequence and allow the red, green and blue lights to pass through. In different embodiments, the filter portions 142 may include red (R), green (G), blue (B), and white (W) filter portions in sequence. Alternatively, if the colors of the filter portions 142 are all the same, the display device can be functioned as a monochrome display. The above-mentioned color filter substrate may be a color filter substrate (CF substrate) in a conventional LCD device, thereby making the display device 1*a* to be a full-color display. In addition, the light-shielding regions 151 of the black matrix layer 15 and the light-shielding regions 142 on the opposite substrate 14 of the present embodiment also have gaps therebetween. In different embodiments, the light-shielding regions 151 of the black matrix layer 15 may extend and contact the transparent substrate 141 respectively, so that a light-shielding region 151 can be formed between two filter portions 142. This disclosure is not limited.

The other technical features of the display device 1*a* can be referred to the same components of the display device 1, so the detailed descriptions thereof are not repeated.

Figure 3A:
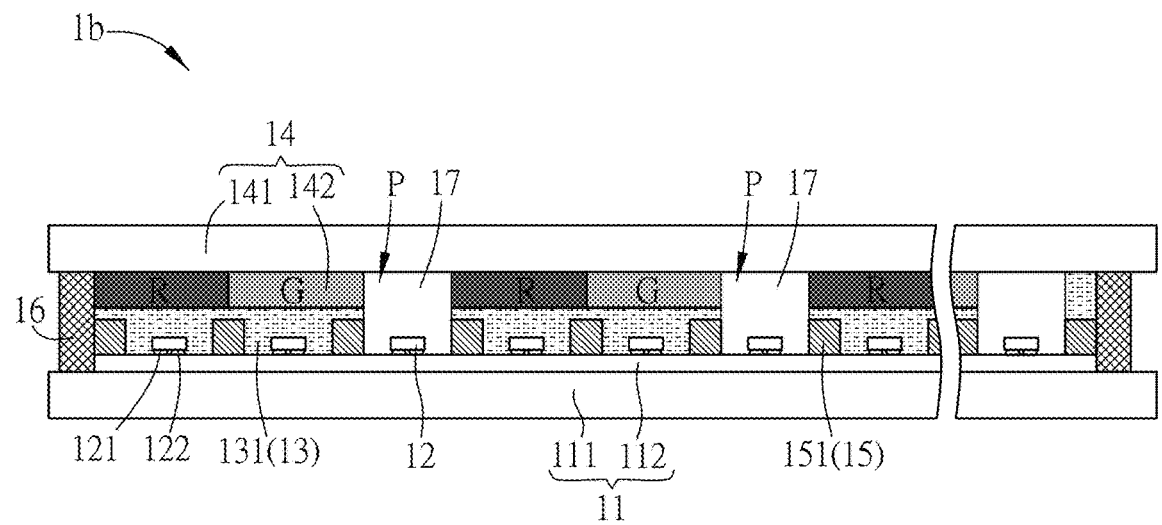
FIG. 3A is a schematic diagram showing another display device of this disclosure.
Figure 3B:
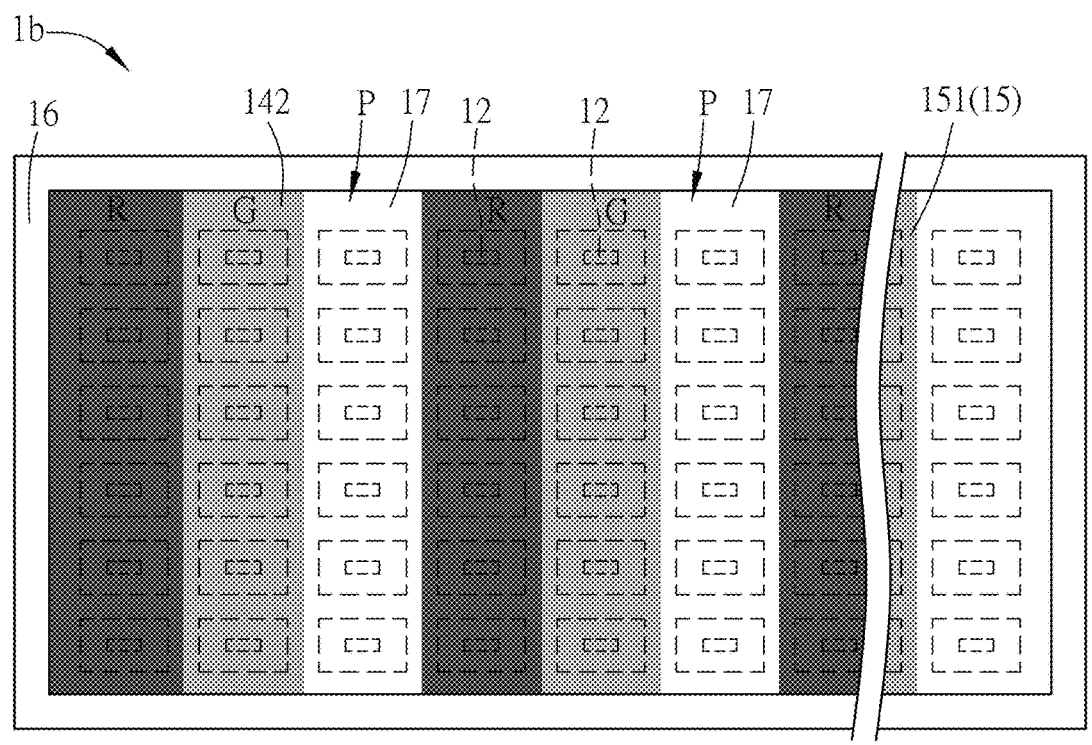
FIG. 3B is a top view of FIG. 3A.

FIG. 3A is a schematic diagram showing a display device 1*b* according to another embodiment of this disclosure, and FIG. 3B is a top view of FIG. 3A. Different from the display device 1*a* of FIGS. 2A and 2B, as shown in FIGS. 3A and 3B, the display device 1*b* further comprises a transparent photoresist member 17. For example, the material of the transparent photoresist member 17 can be the same as the material of the photo-spacers of the LCD panel, such as the photosensitive transparent photoresist materials (e.g. resins, silicates, or glass fibers). The transparent photoresist member 17 is disposed on the transparent substrate 141 of the opposite substrate 14 and covers at least one of the micro light-emitting semiconductor elements 12. At least one of the micro light-emitting semiconductor elements 12 emits blue light or green light. In this embodiment, the filter portions 142 includes only the red filter portions and the green filter portions which are sequentially disposed, and do not include the blue filter portion. The reason of this configuration is that the micro light-emitting semiconductor elements 12 of the present embodiment can emit blue light. Thus, the blue light emitted from the micro light-emitting semiconductor element 12 can directly pass through the transparent substrate 141 to provide the desired blue light, and it is not necessary to provide the light conversion portion 131 and the corresponding blue filter material. In other words, the transparent photoresist member 17 is disposed on the transparent substrate 141 and covers the blue-light micro light-emitting semiconductor element 12, and the part of the opposite substrate 14 corresponding to the transparent photoresist member 17 does not need to be configured with the blue filter portions (and the light conversion portions 131). The blue light emitted from the micro light-emitting semiconductor elements 12 can directly pass through the transparent photoresist member 17 and the transparent substrate 141, thereby making the display device 1b function as a full-color display. Accordingly, the material cost of the blue filter portion and the corresponding light conversion portion 131 can be saved.

In practice, the transparent photoresist member 17 can be correspondingly disposed on a part of the transparent substrate 141 where the blue filter portions are originally configured, and the transparent substrate 141 having the transparent photoresist member 17 is reversed and inserted to the position of the light conversion portion corresponding to the micro light-emitting semiconductor element 12, which can emit blue light, thereby squeezing out the light conversion material provided at this position. As shown in FIGS. 2A and 2B, the blue light emitted from the micro light-emitting semiconductor element 12 is absorbed by the light conversion substance in the light conversion portion 131. However, this embodiment does not configure the light conversion portion and the blue filter material, so that the current value input to the micro light-emitting semiconductor element 12 can be relatively smaller (less than the current value of the micro light-emitting semiconductor elements 12 corresponding to the red filter portion and the green filter portion), and the brightness thereof can be relatively lower. Therefore, the configuration of the transparent photoresist member 17 can not only save the current value input to the micro light-emitting semiconductor elements 12 so as to decrease the power consumption, but also maintain the gap between the opposite substrate 14 and the circuit substrate 11.

The other technical features of the display device 1b can be referred to the same components of the display device 1a, so the detailed descriptions thereof are not repeated.

Figure 3C:
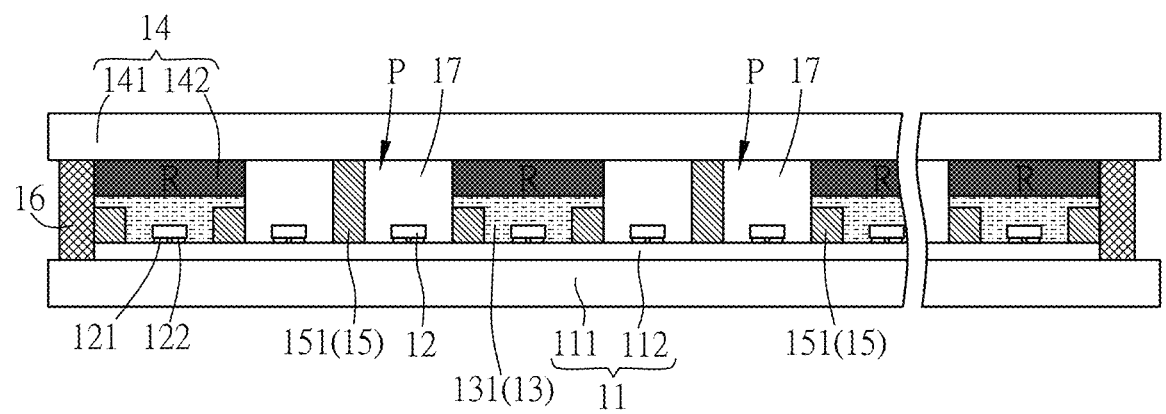
FIG. 3C is a schematic diagram showing another display device of this disclosure.
Figure 3D:
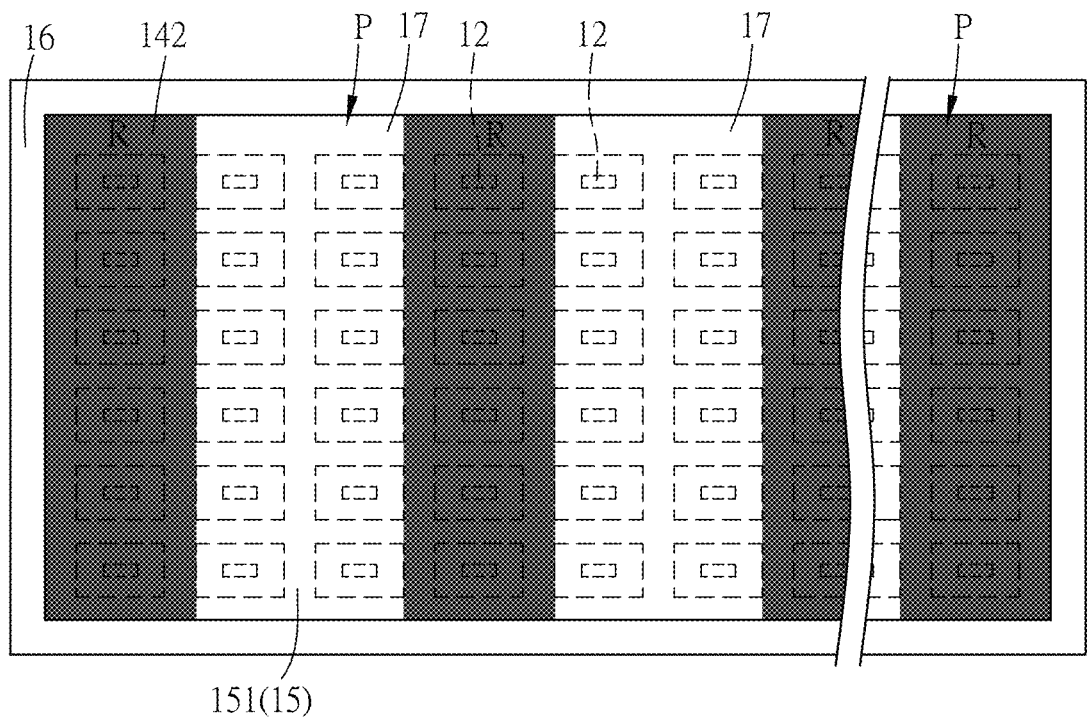
FIG. 3D is a top view of FIG. 3C.

FIG. 3C is a schematic diagram showing a display device 1b according to another embodiment of this disclosure, and FIG. 3D is a top view of FIG. 3C. Different from the display device 1b of FIGS. 3A and 3B, as shown in FIGS. 3C and 3D, the micro light-emitting semiconductor element 12 corresponding to the red filter portion 142 may emit blue light or UV light, or simultaneously emit blue light and green light, the micro light-emitting semiconductor element 12 corresponding to the position of the original green filter portion emits green light, and the micro light-emitting semiconductor element 12 corresponding to the position of the original blue filter portion emits blue light. Therefore, the transparent photoresist member 17 is disposed at a position corresponding to the original green filter portion and the original blue filter portion, so that the green light and the blue light emitted from the micro light-emitting semiconductor elements 12 can pass through the transparent photoresist member 17 and then be output from the transparent substrate 141 (the light does not pass through the light conversion portion 131, the green filter portion and the blue filter portion). This configuration can also make the display device function as a full-color display. Accordingly, not only the material costs of the blue filter portions and the green filter portions as well as the corresponding light conversion portions 131 can be saved, but also the total current value input to the micro light-emitting semiconductor elements 12 can be smaller because that the light conversion portion, the blue filter material and the green filter material are not provided. Thus, the current value input to the micro light-emitting semiconductor elements 12 can be saved to reduce more power consumption. In addition, as shown in FIG. 3C, the light shielding region 151 between two transparent photoresist members 17 completely separates the transparent photoresist members 17 to avoid the light mixing of the green light and blue light emitted from two adjacent pixels P.

In the above embodiment, the design concept that the light emitted from the micro light-emitting semiconductor element passes through the light conversion layer to generate white light can also be applied to the backlight module of the flat display device.

Figure 4A:
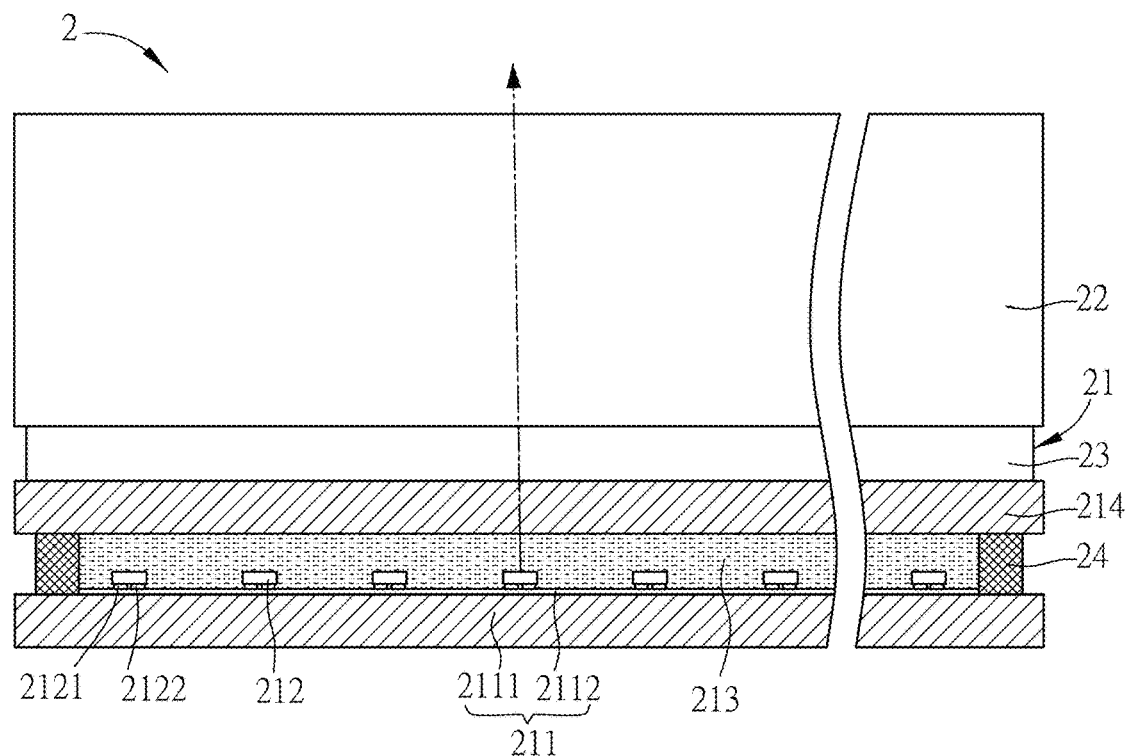
FIG. 4A is a schematic diagram showing another display device of this disclosure.
Figure 4B:
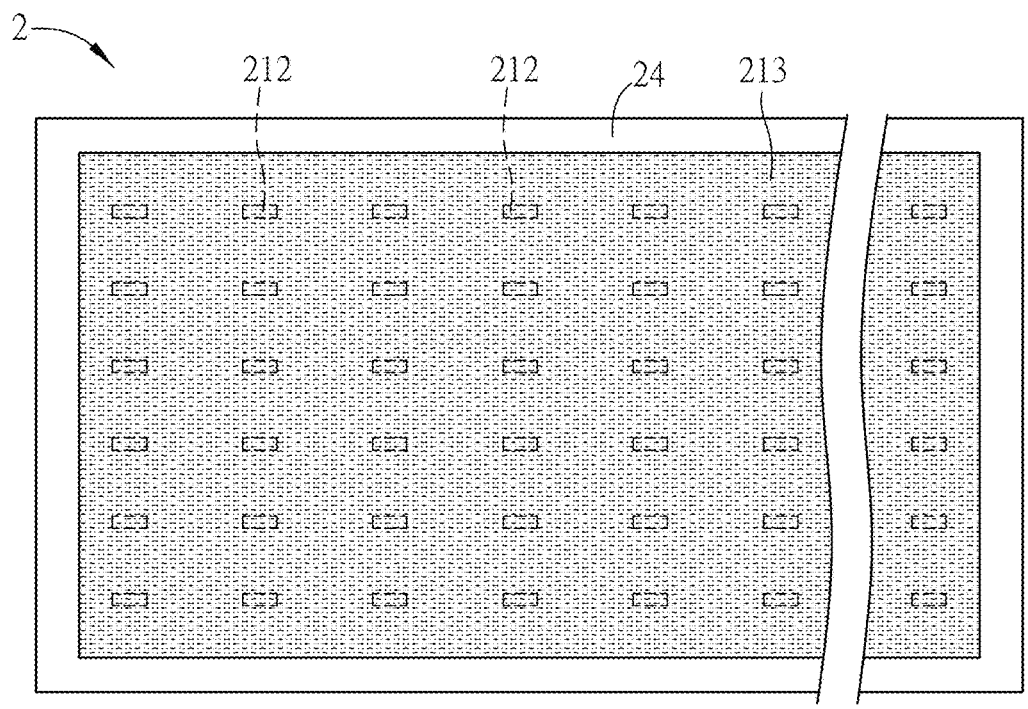
FIG. 4B is a top view of FIG. 4A.

FIG. 4A is a schematic diagram showing a display device 2 according to another embodiment of this disclosure, and FIG. 4B is a top view of FIG. 4A. To be noted, FIG. 4B only shows the necessary components of the top view of the backlight module 21, and the other components are not shown.

As shown in FIGS. 4A and 4B, the display device 2 of the present embodiment is a flat display device such as, for example but not limited to, a liquid crystal display device. The display device 2 can include a backlight module 21 and a display panel 22. The backlight module 21 is disposed opposite to the display panel 22 and can emit light passing through the display panel 22, so that the display panel 22 can display an image. In this embodiment, the display panel 22 is a liquid crystal display panel, such as, for example but not limited to, an in-plane switch (IPS) liquid crystal display panel, a fringe field switching (FFS) liquid crystal display panel, or a vertical alignment mode (VA mode) liquid crystal display panel, and this disclosure is not limited thereto.

The backlight module 21 is a direct-type backlight module, and includes a circuit substrate 211, a plurality of micro light-emitting semiconductor elements 212, and a light conversion layer 213. The micro light-emitting semiconductor element 212 of this embodiment is still exemplified by a micro light-emitting diode (µLED). The micro light-emitting semiconductor elements 212 are separately disposed on the circuit substrate 211. The circuit substrate 211 can be a flexible circuit substrate or a rigid circuit substrate. The circuit board 211 of the present embodiment is, for example, a flexible circuit board, and may include a flexible substrate 2111 and a driving circuit 2112 for driving the micro light-emitting semiconductor elements 212. Accordingly, the driving circuit 2112 of the circuit substrate 211 can be used to control the micro light-emitting semiconductor elements 212 to emit light. Specifically, according to the display requirement of the display panel 22, the corresponding micro light-emitting semiconductor elements 212 are respectively turned on to emit light (or the partial micro light-emitting semiconductor elements 212 are not turned on) controlled by the driving of the circuit substrate 211. Therefore, the backlight module 21 of the display device 2 can achieve the local dimming effect.

In practice, the flexible substrate 2111 can be made by transparent or non-transparent material. The transparent material can be, for example, an organic polymer material. In some embodiments, the above organic polymer material is, for example but not limited to, polyimide (PI), polycarbonate (PC), or polyethylene terephthalate (PET). If the flexible substrate 2111 is made of polyimide (PI), the glass transition temperature thereof can be, for example, between 400° C. and 600° C.

The light conversion layer 213 is disposed on the micro light-emitting semiconductor elements 212. The light emitted from the micro light-emitting semiconductor elements 212 passes through the light conversion layer 213 to generate white light. In some embodiments, the light conversion layer 213 can comprise at least one light conversion substance, and the light conversion substance can be quantum dots or fluorescent particles. In practice, the quantum dots or the fluorescent particles may be mixed in the paste material to form a light conversion material, and the light conversion material may be coated to cover the micro light-emitting semiconductor elements 212 and the driving circuit 2112, and then cured to form the light conversion layer 213. To be noted, the black matrix layer 15 of the above display device 1 is not provided in this embodiment.

In this embodiment, the light conversion substance of the light conversion layer 213 comprises, for example, a quantum dot for absorbing the high-energy light emitted from the micro light-emitting semiconductor element 212. For example, the light conversion substance can absorb the high-energy blue or UV light to excite the low-energy red and green lights. Afterwards, the unabsorbed residual high-energy blue light and generated red and green lights can be outputted from the light conversion layer 213 and then mixed to form a white light. Alternatively, in another embodiment, the quantum dots of the light conversion layer 213 can absorb high-energy blue light and green light emitted from the micro light-emitting semiconductor element 212 to excite the low-energy red light. Afterwards, the unabsorbed residual high-energy blue light and green light and the excited red light are outputted from the light conversion layer 213 and then mixed to form the white light.

In this embodiment, the backlight module 21 may further include an opposite substrate 214. The opposite substrate 214 may be a rigid or flexible plate and disposed between the light conversion layer 213 and the display panel 22. In addition, the backlight module 21 of the present embodiment may further include a sealant layer 24 disposed at the outer peripheries of the circuit substrate 211 and the opposite substrate 214. In some embodiments, the sealant layer 24 may be a light-curable adhesive (e.g. a UV adhesive), and is disposed at the outer peripheries of the circuit substrate 211 and the opposite substrate 214 by, for example but not limited to, a coating method under the atmosphere. Thus, the light conversion layer 213 can be located within the sealant layer 24, the circuit substrate 211 and the opposite substrate 214. In other embodiments, the sealant layer 24 may also be a thermosetting adhesive or a combination of a light-curable adhesive and a thermosetting adhesive, and this disclosure is not limited.

In addition, the backlight module 21 of the embodiment further includes at least one optical film 23 disposed between the display panel 22 and the opposite substrate 214. In some embodiments, the backlight module 21 includes a plurality of optical films 23, and the optical films 23 can be, for example but not limited to, a diffusing plate, a 90° light collector, a 0° light collector, or a brightness enhancement film, or a combination thereof. Accordingly, the light outputted from the conversion layer 213 passes through the opposite substrate 214 and the optical film 23 to form a more uniform surface light source, which is provided for the display panel 22.

To be noted, in different embodiments, the optical film 23 is not configured between the display panel 22 and the opposite substrate 214 so as to save the material cost of the optical film 23. Alternatively, this embodiment may not include the opposite substrate 214, and the optical film 23 can be directly substitute the function of the opposite substrate 214. Accordingly, the interval between the display panel 22 and the light conversion layer 213 only includes the optical film 23, so that the material cost of the opposite substrate 214 can be saved. Alternatively, this embodiment may include an opposite substrate 214, which is an optical film itself. This configuration can also reduce the cost, and this disclosure is not limited.

Figure 5A:
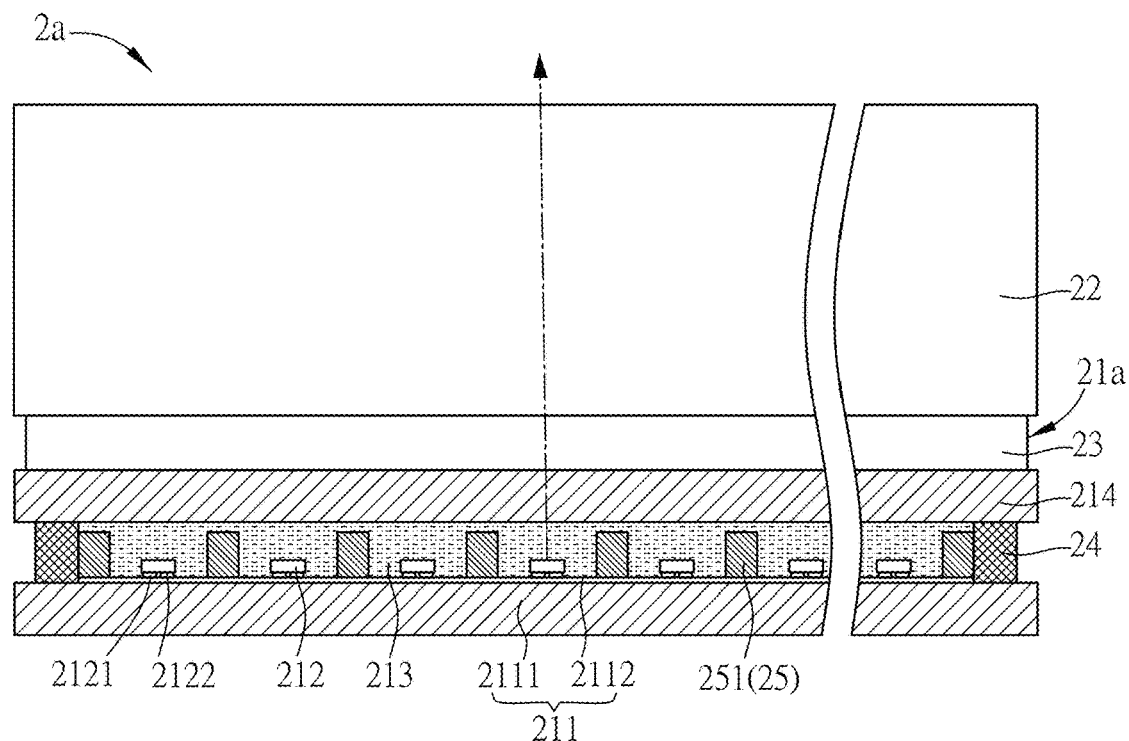
FIG. 5A is a schematic diagram showing another display device of this disclosure.
Figure 5B:
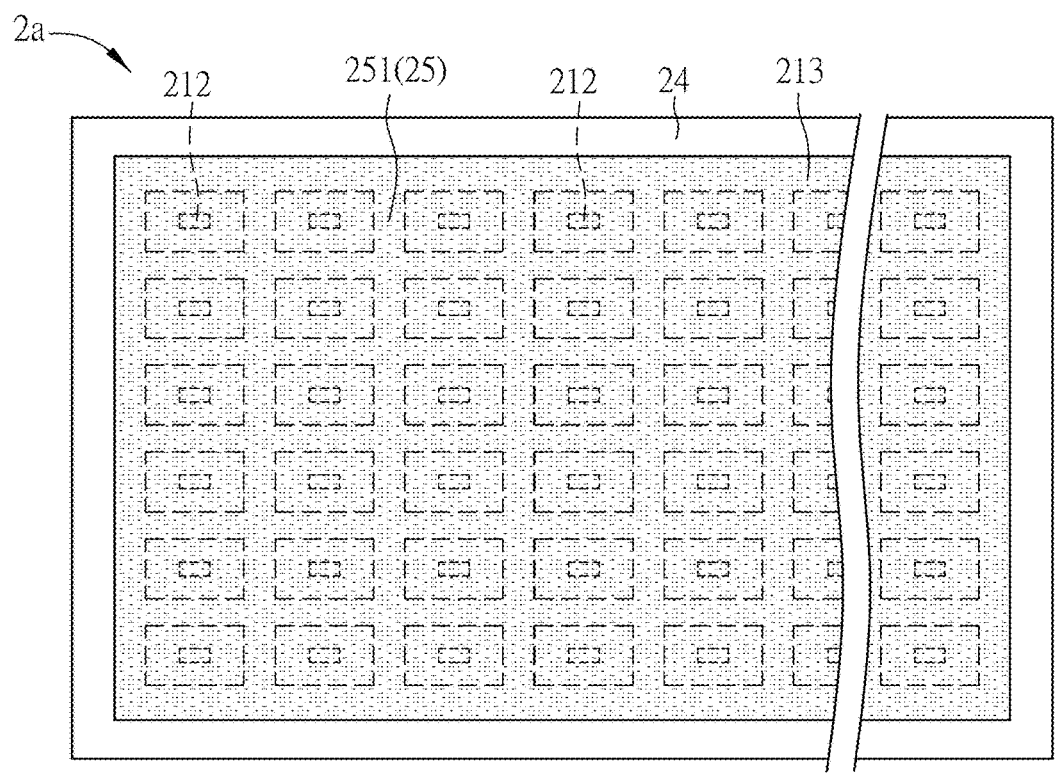
FIG. 5B is a top view of FIG. 5A.
Figure 6A:
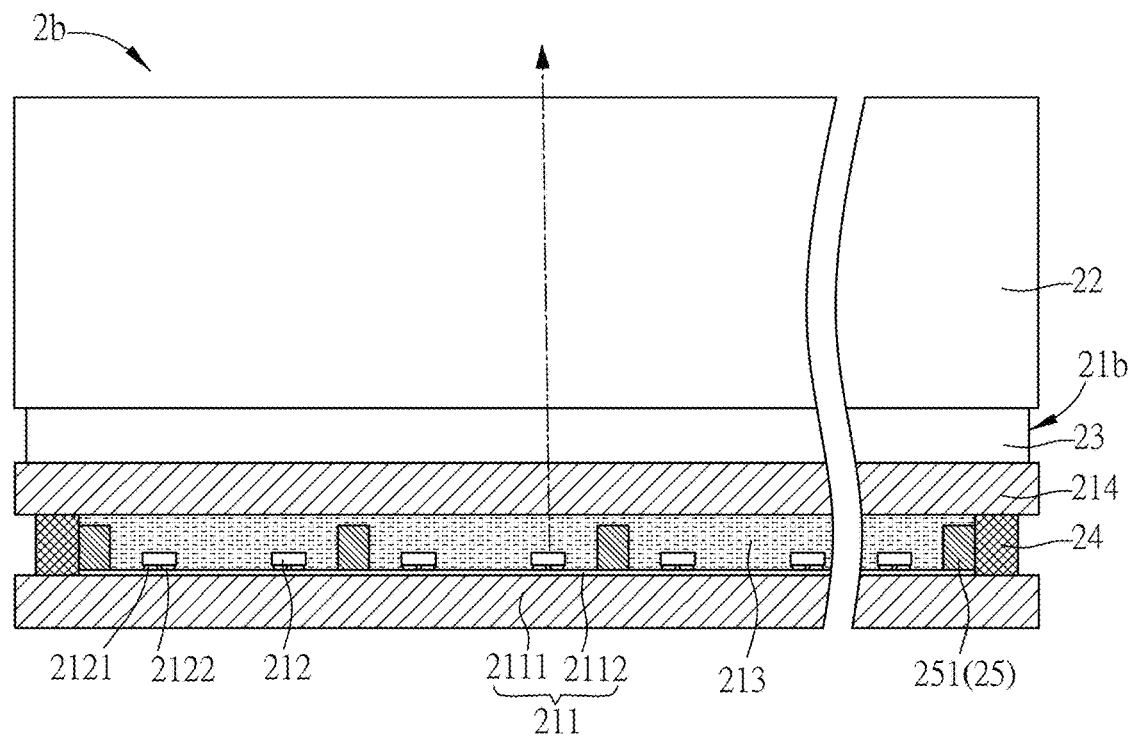
FIG. 6A is a schematic diagram showing another display device of this disclosure.
Figure 6B:
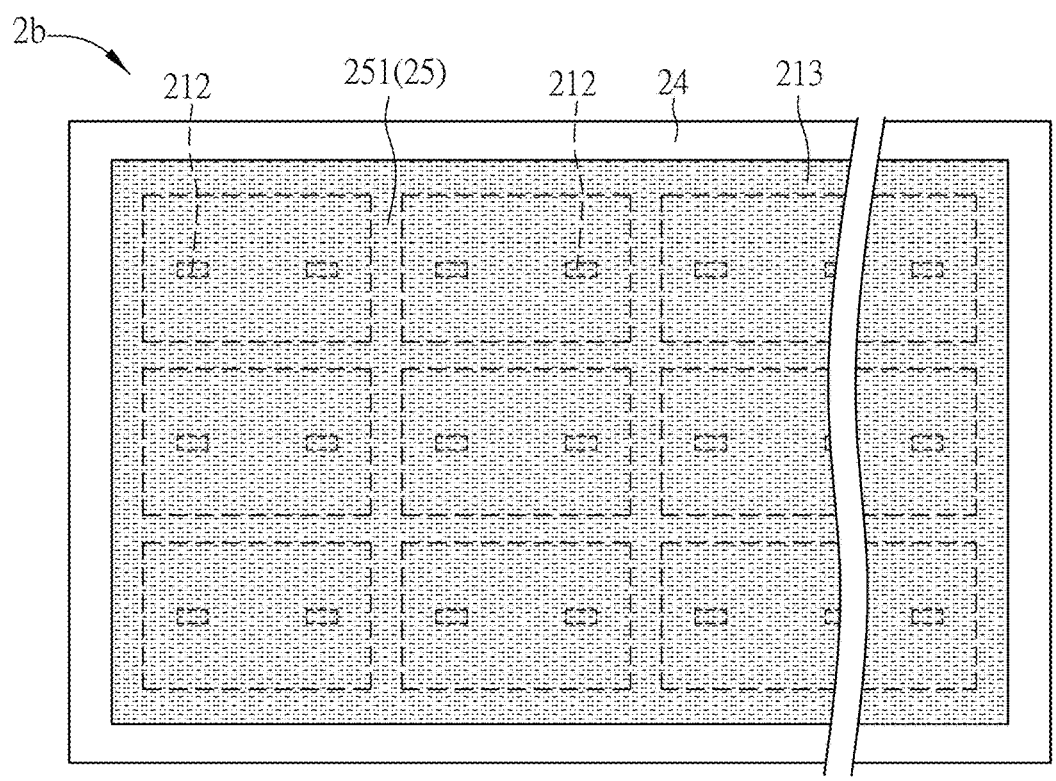
FIG. 6B is a top view of FIG. 6A.
Figure 7:
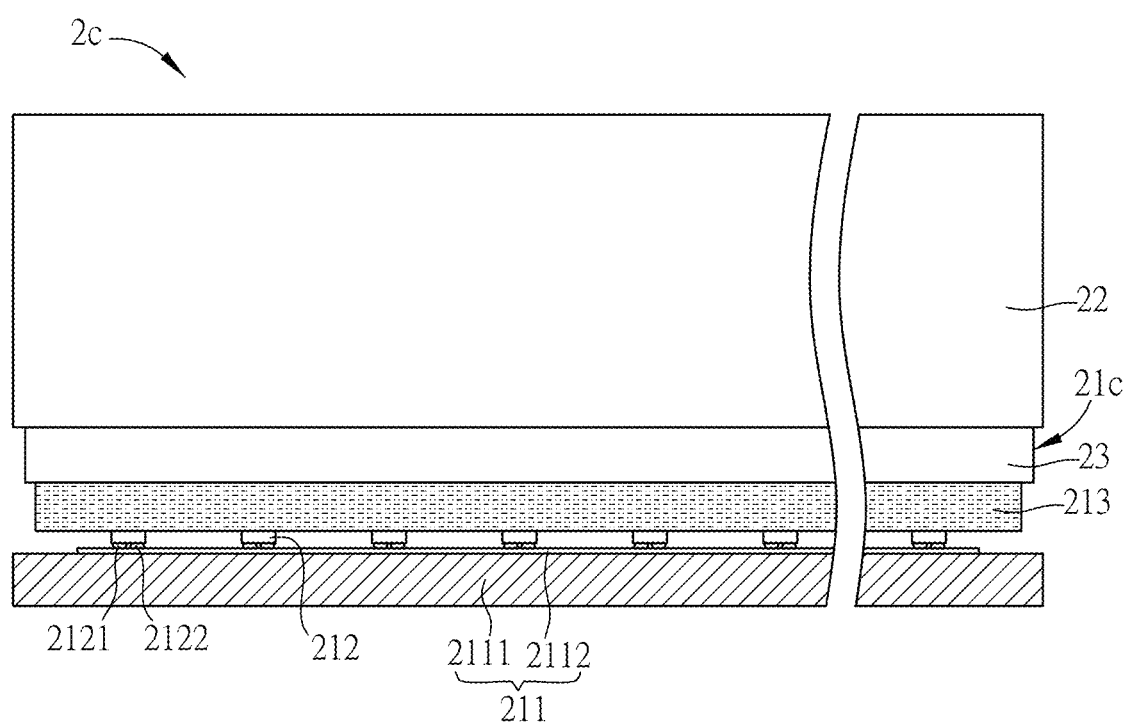
FIG. 7 is a schematic diagram showing another display device of this disclosure.

FIGS. 5A, 6A and 7 are schematic diagrams showing display devices 2a-2c according to different embodiments of this disclosure. FIG. 5B is a top view of FIG. 5A, and FIG. 6B is a top view of FIG. 6A. To be noted, FIGS. 5B and 6B only show the top views of backlight modules 21a and 21b, respectively.

Different from the display device 2 of FIGS. 4A and 4B, as shown in FIGS. 5A and 5B, the display device 2a further comprises a black matrix layer 25 disposed on the circuit substrate 211 and located around the micro light-emitting semiconductor elements 212. In this embodiment, one light shielding region 251 of the black matrix layer 25 surrounds one of the micro light-emitting semiconductor elements 212 to avoid light mixing. The light shielding regions 251 are disposed around the micro light-emitting semiconductor elements 212, respectively, and there is still a space between the light shielding regions 251 and the opposite substrate 214. In different embodiments, the light shielding regions 251 may connect with the opposite substrate 214, and no gap is configured therebetween.

Different from the display device 2a of FIGS. 5A and 5B, as shown in FIGS. 6A and 6B, in the black matrix layer 25 of the display device 2b, one light shielding region 251 surrounds multiple micro light-emitting semiconductor elements 212. In practice, one light shielding region 251 may surround 2×2 micro light-emitting semiconductor elements 212, 2×3 micro light-emitting semiconductor elements 212, or 2×4 micro light-emitting semiconductor elements 212. The configuration of the light shielding regions 251 and the micro light-emitting semiconductor elements 212 can be determined based on the design requirement. In other words, it is unnecessary to provide one light shielding region 251 to surround one micro light-emitting semiconductor element 212, but to provide one light shielding region 251 to surround two or more micro light-emitting semiconductor elements 212. Since the configuration of the light shielding regions 251 and the micro light-emitting semiconductor elements 212 is adjustable, it is possible to control a block of micro light-emitting semiconductor elements 212 to emit light or not, thereby achieving the local dimming function. According to the above design, the driving circuit 2112 for driving the micro light-emitting semiconductor elements 212 is simpler and has lower cost.

Different from the display device 2 of FIGS. 4A and 4B, as shown in FIG. 7, the backlight module 21c of the display device 2c is not configured with the opposite substrate 214, and the light conversion layer 213 is an optical film (such as, for example but not limited to, a QD film). In practice, since the light conversion layer 213 is an optical film, so that it can be manufactured by cutting a large-scaled optical film to obtain the optical film of the desired size, and the manufactured optical film of the desired size can be directly attached on the micro light-emitting semiconductor elements 212. Accordingly, the material preparation and manufacturing process of the light conversion layer 213 become very easy, so that the structure of the display device 2c can be simpler, and the manufacturing cost thereof can be decreased. In addition, the display device 2c of this embodiment is not configured with the sealant layer 24. To be noted, in other embodiments, the display device 2c may be configured with a sealant layer 24 disposed at the outer peripheries of the circuit substrate 211 and the opposite substrate 214 (referring to the display device 2).

The other technical features of the display devices 2a-2c can be referred to the same components of the display device 2, so the detailed descriptions thereof are not repeated.

In summary, the display device of this disclosure is configured with a light conversion layer on the micro light-emitting semiconductor elements, and the light conversion layer has a plurality of light conversion portions disposed respectively corresponding to at least partial of the micro light-emitting semiconductor elements. The light emitted from the micro light-emitting semiconductor element corresponding to each of the sub-pixels passes through the light conversion portion to generate white light. Alternatively, the display device of this disclosure comprises a display panel and a backlight module disposed opposite to each other, and the backlight module comprises a light conversion layer disposed on the micro light-emitting semiconductor elements. The light emitted from the micro light-emitting semiconductor elements passes through the light conversion layer to generate white light. Accordingly, the display device of this disclosure is different from the conventional flat display device, and the structure of the display device of this disclosure has simple structure and can decrease the power consumption and achieve the local dimming function. In some embodiments, the materials are easily prepared, and the manufacturing process is simpler. As a result, the display device of this disclosure has simpler structure and lower manufacturing cost.

Although the disclosure has been described with reference to specific embodiments, this description is not meant to be construed in a limiting sense. Various modifications of the disclosed embodiments, as well as alternative embodiments, will be apparent to persons skilled in the art. It is, therefore, contemplated that the appended claims will cover all modifications that fall within the true scope of the disclosure.

What is claimed is:

1. A display device having a plurality of sub-pixels, the display device comprising:
   a circuit substrate;
   a plurality of micro light-emitting semiconductor elements disposed separately on the circuit substrate and configured corresponding to the sub-pixels;
   a light conversion layer having a plurality of light conversion portions disposed respectively corresponding to at least partial of the micro light-emitting semiconductor elements, wherein light emitted from the micro light-emitting semiconductor element corresponding to each of the sub-pixels passes through the light conversion portion to generate white light at each of the sub-pixels, wherein all of the light conversion portions comprise same content of at least a light conversion substance; and
   an opposite substrate disposed at one side of the light conversion layer away from the circuit substrate.

2. The display device according to claim 1, wherein each of the micro light-emitting semiconductor elements has a side length greater than or equal to 1 µm and less than or equal to 100 µm.

3. The display device according to claim 1, wherein each of the micro light-emitting semiconductor elements emits blue light and green light at the same time.

4. The display device according to claim 1, wherein a thickness of the light conversion layer is greater than or equal to 6 µm and less than or equal to 30 µm.

5. The display device according to claim 1, wherein the light conversion substance is a quantum dot or a fluorescent particle, the quantum dot or the fluorescent particle is mixed within a paste material to form the light conversion layer, and the light conversion layer covers the micro light-emitting semiconductor elements.

6. The display device according to claim 1, wherein the circuit substrate is a matrix circuit substrate, the matrix circuit substrate comprises a substrate and a matrix circuit, the matrix circuit is disposed on the substrate, and the micro light-emitting semiconductor elements are disposed on the matrix circuit and electrically connected with the matrix circuit.

7. The display device according to claim 1, further comprising:
   a black matrix layer disposed on the circuit substrate, wherein the black matrix layer has a plurality of light-shielding regions, and the light-shielding regions are disposed around the micro light-emitting semiconductor elements to form the light conversion portions.

8. The display device according to claim 1, wherein the opposite substrate is a cover substrate, a monochrome filter substrate, or a color filter substrate.

9. The display device according to claim 8, wherein the color filter substrate comprises a transparent substrate and a plurality of filter portions, each of the filter portions is disposed between the transparent substrate and corresponding one of the light conversion portions, and the filter portions are disposed corresponding to the micro light-emitting semiconductor elements, respectively.

10. The display device according to claim 1, further comprising:
    a transparent photoresist member disposed on the opposite substrate and covering at least one of the micro light-emitting semiconductor elements, wherein at least one of the micro light-emitting semiconductor elements emits blue light or green light.

11. The display device according to claim 10, wherein a part of the opposite substrate corresponding to the transparent photoresist member is not configured with a filter material.

12. The display device according to claim 1, further comprising:
    a sealant layer disposed at outer peripheries of the circuit substrate and the opposite substrate.

13. A display device, comprising:
    a backlight module comprising a circuit substrate, a plurality of micro light-emitting semiconductor elements, and a light conversion layer, wherein the micro light-emitting semiconductor elements are disposed separately on the circuit substrate, all of the light conversion layer comprise same content of at least a light conversion substance, the light conversion layer is disposed on the micro light-emitting semiconductor elements, and light emitted from the micro light-emitting semiconductor elements passes through the light conversion layer to generate white light; and a display panel disposed opposite to the backlight module.

14. The display device according to claim 13, wherein each of the micro light-emitting semiconductor elements emits blue light and green light at the same time.

15. The display device according to claim 13, wherein the light conversion substance is a quantum dot or a fluorescent particle, the quantum dot or the fluorescent particle is mixed within a paste material to form the light conversion layer, and the light conversion layer covers the micro light-emitting semiconductor elements.

16. The display device according to claim 13, wherein the light conversion layer is an optical film.

17. The display device according to claim 13, wherein the backlight module further comprises an opposite substrate, the opposite substrate is disposed between the light conversion layer and the display panel, and the opposite substrate is an optical film.

18. The display device according to claim 13, further comprising:
- a black matrix layer disposed on the circuit substrate, wherein the black matrix layer has a plurality of light-shielding regions, and the light-shielding regions are disposed around the micro light-emitting semiconductor elements.

* * * * *